April 26, 1932.  J. F. HIGBEE  1,855,237
TRAILER
Filed Jan. 12, 1929
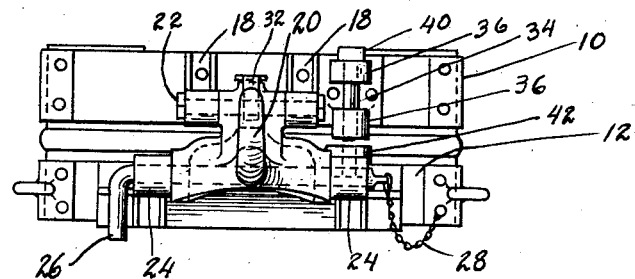
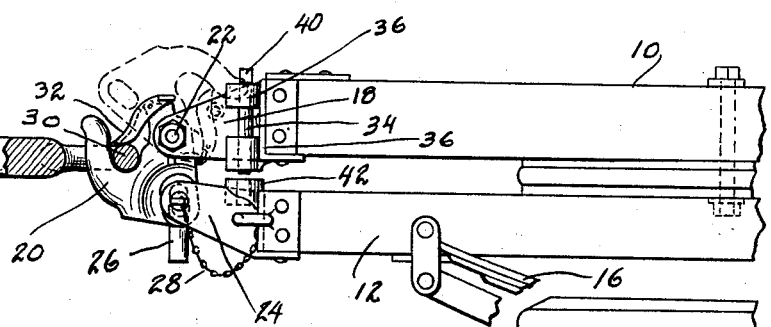
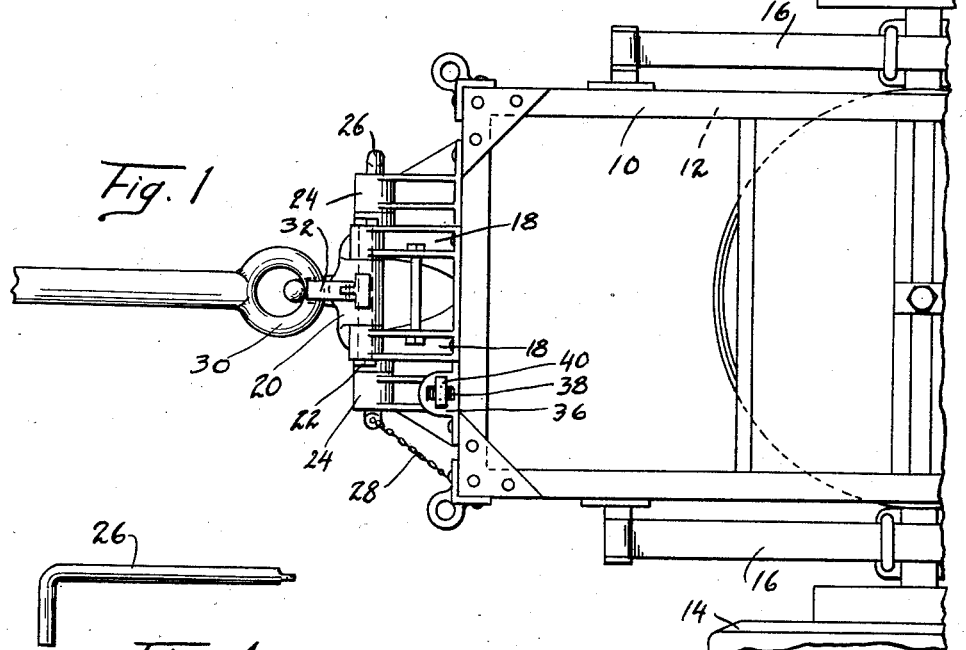
INVENTOR.
James F. Higbee
BY Parker & Burton
ATTORNEYS Patented Apr. 26, 1932

1,855,237

UNITED STATES PATENT OFFICE

JAMES F. HIGBEE, OF DETROIT, MICHIGAN, ASSIGNOR OF ONE-HALF TO STEPHEN A. GRIGGS, OF DETROIT, MICHIGAN

TRAILER

Application filed January 12, 1929. Serial No. 332,007.

My invention relates to improvements in trailers and particularly to an improved coupling or connection for a trailer adapted to cooperate in coupling the trailer up in a train or with a tractor and which also is operable to lock the axle frame of a fifth wheel trailer to the trailer frame in alignment therewith.

The invention pertains particularly to that type of trailers known as being of the fifth wheel type where there is provided an axle sub-frame carried by the axle which swivels with respect to the main frame of the trailer and which is pivoted therebelow at one end of the trailer frame and includes a coupling connection such as a hook member which is adapted to engage the eye piece of the drawbar to couple the trailer to a tractor or to another trailer, which hook member serves as a part of the locking mechanism adapted to lock the axle sub-frame to the trailer frame in alignment therewith. In addition, auxiliary locking mechanism, entirely independent of this drawbar hook, is also provided for the same locking purpose.

Other meritorious features and advantages of my improved structure will more fully appear from the following description, appended claims and accompanying drawings, wherein,—

Fig. 1 is a plan at one end of a trailer having mechanism embodying my invention.

Fig. 2 is a fragmentary elevation of the structure shown in Fig. 1.

Fig. 3 is a rear end elevation of the structure shown in Fig. 1.

Fig. 4 is an illustration of one of the locking pins.

In the several views of the drawings there is illustrated one end of a fifth wheel trailer wherein the main trailer frame is indicated as 10 and the swiveled axle sub-frame as 12. This axle frame is supported upon road wheels 14 by springs 16 in a conventional manner and is pivoted to the trailer frame to swivel with respect thereto.

Means are provided to couple this trailer to another trailer or to a tractor and also to lock the axle frame 12 to the trailer frame 10 and in alignment therewith and my invention resides in improvements in these means.

I have shown a pair of horizontally spaced apart rigid arms 18 carried by and projecting rearwardly from the end of the trailer frame 10, between which arms is pivoted a drawbar hook 20 upon a horizontal pivot pin 22, so that the hook may be drawn upwardly to the position indicated in dotted line in Fig. 2, or may be allowed to depend as shown in solid line in the same figure of the drawings.

The axle frame is likewise provided with a pair of horizontally spaced apart rigid arms indicated as 24 which are here shown as spaced apart a distance greater than the arms 18 and adapted to receive a portion of the back of the drawbar hook, as indicated in Figs. 1 and 2, when the same is swung downwardly and when the axle frame and trailer frame are positioned in alignment.

I provide a pin 26 which is receivable through pin openings in the arms 24 and through a bearing in the drawbar hook 20 and one end of which may be engaged by a chain 28 to secure the pin in place to lock the drawbar hook in position to hold the two frames in alignment and supporting the drawbar hook with the hook portion upright to engage the eye of the drawbar such as is shown in Fig. 2, with the eye indicated as 30. This drawbar hook may be provided with a spring catch 32 to retain the eye of the drawbar therein.

Auxiliary means is also provided to lock the axle frame to the trailer frame independently of the drawbar hook and this is here shown as including a locking pin 34 carried by a pair of loops 36 on the trailer frame. The uppermost lop is cut away as at 38 to receive the elongated head 40 of the locking pin when the same is turned in a given direction, which permits the locking pin to drop downwardly within the loop so that the lower end thereof may be received within a pin opening in a loop 42 on the axle frame 12, thereby serving to lock the axle frame in alignment with the trailer frame. In the elevated position the locking pin is free of the loop 42.

What I claim is:

1. A trailer of the fifth wheel type having, in combination, a trailer frame, an axle sub-frame swiveled to and below the trailer frame at one end thereof, a drawbar hook supported upon a horizontal pivot at one end of the trailer frame to be swung upwardly above said pivot or to be allowed to hang therebelow, a cooperating part carried by the sub-frame arranged below and in line with said drawbar hook when the sub-frame is in alignment with the trailer frame and including a pair of horizontally spaced apart arms adapted to receive a portion of the drawbar hook between them and means carried by said arms adapted to secure the drawbar hook between the arms locking said sub-frame to the trailer frame.

2. A trailer of the fifth wheel type having an axle frame, a trailer frame having one end swiveled upon the axle frame whereby in one position said frames are in alignment, a drawbar coupling hook pivoted to the end of one of said frames, and adapted to engage a drawbar a hook-engaging part carried by the other frame arranged to be normally in line with and to receive said hook when said frames are in alignment, said hook adapted to be swung upon its pivot support to be engaged with said part to lock said frames in alignment, and means engaging said hook and part to lock the hook thereto.

3. A trailer of the fifth wheel type having an axle frame, a trailer frame having one end swiveled upon the axle frame whereby in one position said frames are in alignment, a drawbar hook pivoted to the end of one of said frames, a hook-engaging part carried by the other frame and including a pair of spaced arms arranged to be normally in line with and to receive the back of said hook when said arms are in alignment, said hook adapted to be swung upon its pivot support whereby its back is received between said arms to lock said frames in alignment, and means receivable through the back of said hook and said arms to lock the hook removably in position therebetween with the hook open upwardly to normally receive a drawbar eye.

4. A trailer of the fifth wheel type having, in combination, a trailer frame, an axle sub-frame pivoted at one end thereof below the trailer frame, a drawbar coupling connection pivoted at one end of one of said frames upon a horizontal pivot, a cooperating part carried at the adjacent end of the other frame to receive said connection when swung to one position to lock said frames in alignment, means operable to lock said connection to said part to secure said frames in alignment.

5. A trailer of the fifth wheel type having, in combination, a trailer frame, an axle sub-frame pivoted at one end thereof below the trailer frame, a drawbar connection mounted upon a horizontal pivot at one end of the trailer frame, a cooperating part on the adjacent end of the other frame, and means operable to couple said connection to said part when the same is swung to one position to lock said frames in alignment, said drawbar connection adapted when in said locking position to engage a drawbar.

6. A trailer of the fifth wheel type having, in combination, a trailer frame, an axle sub-frame pivoted at one end thereof below the trailer frame, a pair of spaced arms carried by and projecting rearwardly from each frame, a drawbar hook supported on a horizontal pivot between the spaced arms of the trailer frame adapted to be swung upwardly to overhang said arms or to depend therebelow to be received between the arms of the axle frame when said frames are in alignment, means adapted to connect said drawbar hook between the arms of the axle frame to lock said frames in alignment.

In testimony whereof, I, JAMES F. HIGBEE, sign this specification.

JAMES F. HIGBEE.